(12) United States Patent
Burner et al.

(10) Patent No.: US 7,600,447 B2
(45) Date of Patent: Oct. 13, 2009

(54) ACTUATION LEVER

(76) Inventors: Keith Richard Burner, 10 Johnson Rd., Scarborough, ME (US) 04074; Scott Albert Burner, 84 Hall Rd., Windham, ME (US) 04062

( * ) Notice: Subject to any disclaimer, the term of this patent is extended or adjusted under 35 U.S.C. 154(b) by 509 days.

(21) Appl. No.: 11/179,147

(22) Filed: Jul. 12, 2005

(65) Prior Publication Data

US 2007/0012136 A1    Jan. 18, 2007

(51) Int. Cl.
F16C 1/10    (2006.01)

(52) U.S. Cl. .................................................. 74/502.2

(58) Field of Classification Search ............... 74/486, 74/488, 489, 500.5, 51.6, 502, 502.2, 519, 74/522.5, 523, 524, 544; 16/110.1, 421, 16/427; 81/177.1, 342, 381, 415, 427, 427.5, 81/489; 482/44, 49; 124/31
See application file for complete search history.

(56) References Cited

U.S. PATENT DOCUMENTS

| | | | | |
|---|---|---|---|---|
| 651,706 | A | * | 6/1900 | Forbes ........................ 192/46 |
| 2,181,359 | A | * | 11/1939 | Barrett ....................... 254/267 |
| 3,745,842 | A | * | 7/1973 | Brems ........................ 74/110 |
| 4,023,450 | A | | 5/1977 | Ygfors |
| 4,088,040 | A | | 5/1978 | Ross-Myring |
| 4,301,694 | A | | 11/1981 | Costa |
| 4,307,625 | A | | 12/1981 | Lauzier |
| 4,316,531 | A | | 2/1982 | Harpster |
| 4,597,589 | A | * | 7/1986 | Fujii et al. ................... 280/821 |
| 4,798,377 | A | * | 1/1989 | White .......................... 482/49 |
| 4,840,082 | A | | 6/1989 | Terashima et al. |
| 5,287,765 | A | | 2/1994 | Scura |
| 5,311,792 | A | | 5/1994 | Brown et al. |
| 5,659,959 | A | | 8/1997 | Parlowski |
| 5,924,328 | A | | 7/1999 | Okajima |
| 5,941,127 | A | | 8/1999 | Hayd |
| 5,979,015 | A | | 11/1999 | Tamaribuchi |
| 6,082,767 | A | * | 7/2000 | Bujold et al. ................ 280/819 |
| 6,176,398 | B1 | | 1/2001 | Chang |
| 6,263,754 | B1 | | 7/2001 | Wesling et al. |
| 6,640,949 | B1 | | 11/2003 | Vranish |
| 6,817,458 | B1 | | 11/2004 | Gauthier |

\* cited by examiner

*Primary Examiner*—Vicky A Johnson
(74) *Attorney, Agent, or Firm*—Patricia M. Mathers

(57) ABSTRACT

An actuator assembly for hand-grippable devices, such as levers for a brake or clutch, triggers, scissor-action tools, etc. The actuator assembly is a lever having a rotation-restriction mechanism, such as a one-way bearing, mounted on a shaft, with a sleeve assembled over the rotation-restriction mechanism and shaft. As the lever is grasped by the fingertips and pulled toward the operator's palm, the sleeve rotates about the shaft axis, thereby allowing the lever to roll from the fingertips toward the base of the fingers near palm of the operator's hand, where the operator has greater strength and control over the lever. The sleeve is prevented from rotating in the reverse direction, so, when the operator releases the lever, the lever slides along toward the fingertips, allowing the operator to slow the motion as desired. The actuator assembly reduces fatigue and loss of control over hand-operated mechanisms.

18 Claims, 4 Drawing Sheets

ACTUATION LEVER

BACKGROUND INFORMATION

1. Field of the Invention

The present invention relates to the field of actuation levers. More particularly, it relates to a lever that rotates about a first axis that is central to the lever while the lever pivots about a second axis of rotation orthogonal to the first axis.

2. Description of the Prior Art

A lever connected to a pivot hinge is a well-known device for actuating countless mechanisms. A typical example is a lever to actuate a brake or clutch on a bicycle or motorcycle. The operator, to release the clutch or apply the brakes, pulls a lever that is pivotably mounted on the handlebar toward the handlebar. A brake or clutch cable is attached to the lever and pulling on the lever pulls on the cable.

A major disadvantage of the conventional pivot-hinge lever is that it requires a fair amount of force to actuate the mechanism. This is particularly disadvantageous when the pivot-hinge lever is mounted such, that the operator must grasp it with his or her fingertips, as is conventionally the case with brake or clutch levers on bicylces or motorcycles. The levers are spring-biased to return to a resting position. To operate the lever, the operator keeps the palm of his or her hand on the handlebar and reaches with the fingertips to grasp the lever and pull it toward the handlebar. In doing so, the operator has to expend significant effort to maintain control of the lever and to prevent it from springing back to its biased position. Unfortunately, the fingertips do not have as much strength as the base end of the fingers have closer to the palm of the hand. The disadvantage is exacerbated by the fact that the lever may have to be held in the squeezed position for a period of time that is long enough to cause fatigue and pain in the operator's hand, or worse, that causes the operator to inadvertently let go of the lever and lose control over the brake or clutch function.

Another example of such a pivot-hinge lever is found in the grips of tools, such as a pair of pliers or shears, or a hand exercise device. Pulling one handle toward the other or squeezing both handles together forces the operating ends of the tool together. With some tools, the handles are far apart and the operator is using his or her fingertips to grasp one of the handles. The same difficulties as described above apply to the operation of such tools. The operator is using fingertips to exert force on a lever and to maintain control over it, resulting in strain and fatigue of the fingers after only a short time of use. With the hand exercise device, the purpose is to strengthen the hand muscles, not necessarily those of the outer fingertips. With some conventional hand exercise devices, the fingertips may be required to exert undue force and strength to pull one handle toward the other to the point where the handles are close enough together that the major muscles of the hand are then used to squeeze the handles together. This is a disadvantage, as repetitive exercises with the hand device cause undue strain and fatigue on the fingertips.

Yet another example of such a pivot-hinge lever is a gun trigger. It is highly desirable to pull back on the trigger with force evenly applied in the direction of the trigger action, without applying lateral forces to the trigger, as they may may skew the aim. The fingertip up to the first finger joint is typically used to appy force to the trigger. The conventional trigger does not accommodate for any lateral forces applied by the trigger finger and it requires a great deal of training to fire a gun with the desired control and aim.

What is needed therefore, is an actuation lever that eases the strain of holding a mechanism in a particular state of actuation. What is further needed is such an actuation lever that moves the point of force exertion away from the tips of the fingers in toward the base of the fingers. What is yet further needed is such an actuation lever that is simple and inexpensive to manufacture.

BRIEF SUMMARY OF THE INVENTION

The present invention is an actuator assembly that rotates about a central axis that extends through the lever as it is being pulled to actuate a mechanism. The rotating action of the lever allows it to travel from the fingertips toward the base of the fingers of the operator, where the operator has much greater strength and control. The actuator assembly according to the invention comprises a shaft, a rotation-restriction mechanism mounted on the shaft, a sleeve assembled over the rotation-restriction mechanism and the shaft, and an attachment means. The rotation-restriction mechanism allows the sleeve to rotate in one direction, but not in the other. The advantage of this actuator assembly is that, as the operator pulls the lever, i.e. the shaft, to an actuation position, the sleeve rotates in a direction that facilitates rolling travel of the sleeve from the fingertips in toward the base of the fingers near the palm of the hand. When fully actuated, the lever of the actuator assembly according to the invention is positioned somewhere between the knuckle joint and the second finger joint. In this position, the operator is able to exercise maximum hand strength and exert the greatest amount of control over the lever.

The rotation-restriction mechanism used in the actuator assembly according to the invention may be a one-way bearing or a ratcheting mechanism. The description of the invention will be based on an embodiment of the invention that uses a one-way bearing, but it shall be understood that a ratcheting mechanism may be substituted for the one-way bearing. The one-way bearing is a conventional bearing that is also commonly known as a sprag bearing or a one-way clutch bearing. Many types of such bearings are known and the invention does not require the use of a particular type of one-way bearing, only that the bearing restrict rotation of the outer surface of the lever to one direction. Depending on the particular application or length of the actuator assembly or the size of the bearings, one or more one-way bearings may be mounted on the shaft. For example, a one-way bearing may be mounted at one end, at or near the center of the shaft, or at both ends of the shaft. Similarly, there are many types and designs of ratcheting mechanisms and the scope of the invention includes any embodiment of a ratchet device that can be suitably mounted on the shaft.

Typical applications of the actuator assembly according to the invention are for brake and clutch levers on bicycles and motorcylces, referred to hereinafter collectively as "bikes." In such applications, the lever is biased toward a resting or open position. The operator supports the palm of the hand on the handlebar, grasps the lever with the fingertips and pulls the lever toward the handlebar. As the lever is pulled toward the handlebar, the force exerted on the sleeve causes it to rotate about the shaft axis. This allows the sleeve to rollingly travel along the gripping surface of the fingertips in toward the knuckle joint or the palm of the hand. With conventional bike levers, there is no rolling action, and the fingertips themselves do not shift position relative to the lever, but move with the lever toward the palm. When the force exerted on the lever is relaxed, the lever moves back toward the resting position, but the lever does not roll during this part of the travel. The lever exerts the greatest amount of biasing force toward the resting position when it is completely pulled in and, thus, at the beginning of its outward travel. This force diminishes as the lever approaches the resting position. Advantageously, as the lever is released from its actuated position, the lever is positioned at the base of the fingers, between the kunckle joint and the second finger joint, where the operator has the greatest strength and control. As the lever travels toward the resting position, it slides along the gripping surface of the fingers toward the fingertips. Less force is required to control the lever as it moves toward the resting position and toward the tips of the fingers. Thus, the actuator assembly according to the invention, increases the ease and operator control over the motion of the lever and, consequently, reduces fatigue and improves improves operational safety.

Other applications for the actuator assembly according to the invention include grippers for scissor-action tools, such as plier, shears, and cutters, and hand exercise devices. Typical for the scissor-action tools is a pivot point connecting two elongate members, one end of a member being a gripper, the other end being the tool end. The two members are connected in an X configuration at the pivot point. The tool is operated by squeezing the grippers together, or moving one gripper toward the other. Often, the grippers are far apart, are biased to an open position, and/or require significant amount of strength to operate. Persons with small hands have a particularly hard time operating such tools, and often suffer fatigue in the hands. The actuator assembly according to the invention is to be incorporated into one of the grippers, which is referred to hereinafter as an "active" gripper, the other gripper being a "passive" gripper. The passive gripper lies in the palm of the operator's hand and the active grippper is grasped by the fingertips. During the process of pulling the active gripper toward the passive gripper, the active gripper, having a sleeve, a one-way bearing bearing, and a shaft, rolls along the gripping surfaces of the fingers toward the base of the fingers near the palm of the hand. As described above, this allows the operator to exercise greater control over the tool, with less fatigue, because the greatest force required to operate the tool is applied while the active gripper is moving toward or is at the base of the fingers. Analogously, the actuator assembly may be incorporated into one of the grippers of hand exercise devices that comprise a coiled spring with two grippers.

The actuator assembly according to the invention may be incorporated into countless other devices that require that the operator exert force and control over the motion or position of a lever. Another example of a useful application of the actuator assembly is with a trigger of a gun. The conventional trigger is squeezed toward a trigger point. Ideally, the motion exerted on the trigger is smooth and continuous, and sometimes, very slow. This smooth, continuous, slow squeezing motion is difficult to accomplish without repetitive training. The actuator assembly may be incorporated into the trigger assembly, to allow the trigger lever to roll along the inside of the operator's trigger finger as the trigger is squeezed, which makes it easier for the operator to control the squeezing motion of the trigger finger.

DETAILED DESCRIPTION OF THE INVENTION

Figure 1:
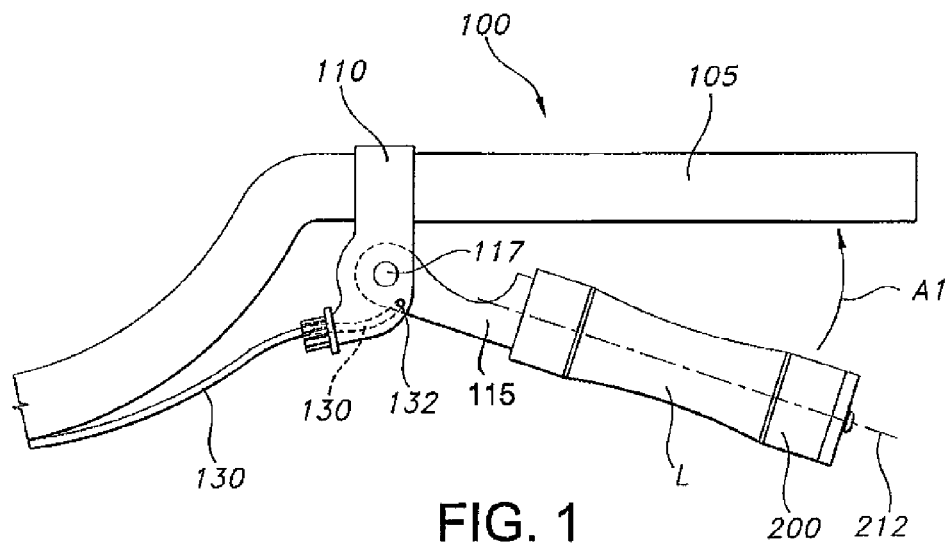
FIG. 1 illustrates a handle assembly, showing the actuation lever according to the invention.

FIG. 1 illustrates a handle assembly 100 that is frequently mounted on a handlebar 105 of a bike, and that is used to actuate a brake or clutch assembly. The handle assembly 100 shown here comprises a mounting bracket 110 and a handle 115, both known to the art, and an actuation lever L. The handle 115 is pivotably connected to the mounting bracket 110 at pivot point 117 and is biased to a resting or an open position, as shown. Typically, a proximal end of a cable 130 is connected in a conventional way to the handle 115 at a cable attachment point 132. Pulling the actuation lever L toward the handlebar 110 in the direction indicated by arrow A1 exerts a pull on the cable 130, which actuates the brake or clutch assembly connected to a distal end of the cable 130.

FIG. 1 also shows a first embodiment of an actuator assembly 200 according to the invention and illustrates use of the assembly as the actuation lever L that is used to actuate a brake cable on a bike, but this is merely for purposes of illustration and does not limit the application of the actuator assembly to such uses. Rather, the actuator assembly 200 may be used as an actuation means for a variety of displacement mechanisms that include but are not limited to actuating cables, latches, triggers, and scissor-action tools, such as pliers and shears. Accordingly, the actuator assembly 200 does not have to be attached to another device in the same configuration as shown in this first embodiment, but, depending on the particular embodiment and intended application, the actuator assembly 200 may be incorporated into tool grippers or be connected at each end of the assembly 200 to another device.

Figure 2:
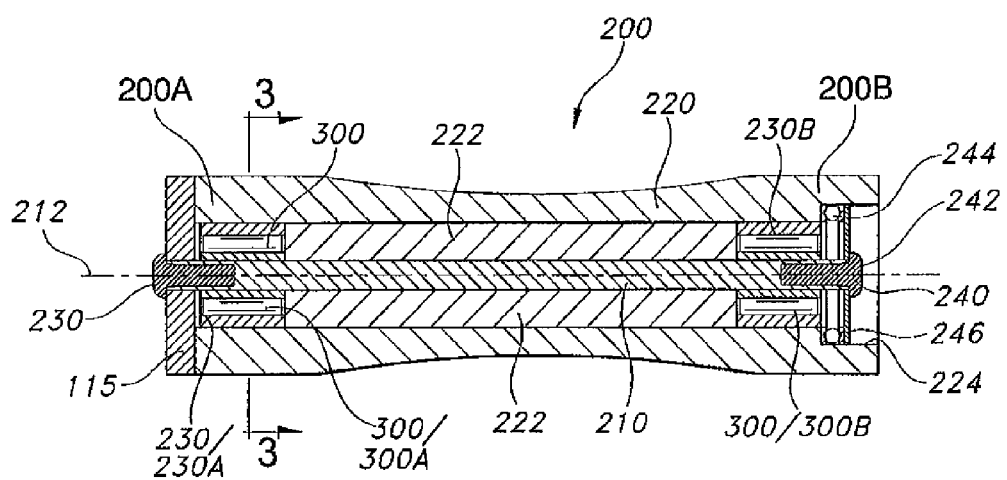
FIG. 2 is a perspective view of the shaft attached to the handle.

FIG. 2 is a cross-sectional view of an actuator assembly 200 according to the invention comprising a shaft 210, a sleeve 220, a rotation-restriction mechanism 300, and attachment means 230. The actuator assembly 200 has a first or proximal end 200A that attaches to the handle 115 and a second or distal end 200B. The actuator assembly 200 allows rotation of the sleeve 220 in one direction about a longitudinal axis 212 that extends along a centerline of the shaft 210, as indicated by directional arrow A2 in FIG. 3, and prevents rotation in the opposite direction. The rotation-restriction mechanism 300 may be any one of mechanisms that restrict rotation about an axis to one direction. Such mechanisms include, but are not limited to, one-way bearings and ratcheting mechanisms. As is shown in FIG. 1, the shaft 210 is fixedly attached to the handle 115 by the attachment means 230. Suitable attachment means 230 include a threaded fastener or other means that will securely and pivotably attach the shaft 210 to the handle 115.

Referring again to FIG. 2, two rotation-restriction mechanisms 300 are shown mounted on the shaft 210 and the sleeve 220 is assembled over the rotation-restriction mechanisms 300. It is understood, that one or more rotation-restriction mechanisms 300 may be assembled anywhere along the shaft 210, depending on the specific dimensions of the actuator assembly 200. In the description that follows, a one-way bearing will be used to represent the rotation-restriction mechanism 300. The one-way bearing is a conventional bearing, also commonly known as a sprag bearing or a one-way clutch bearing. In the embodiment shown, the one-way bearing is a steel needle-roller clutch bearing. Examples of suitable bearings include the INA Bearing, HF1012 1372238, and the types of bearings disclosed in U.S. Pat. Nos. 6,543, 592 B2 and 3,990,555. The typical sprag or one-way bearing comprises a bearing case 310, a plurality of rollers 320, and a cage 330. Motion of the rollers 320 is controlled by the contour of the cage walls and possibly other means, such as a spring. Typically, when the rollers are in the middle of the cage or up against one side of the cage, they can spin freely. Reversing the direction of rotation shifts the rollers to the other side of the cage, where the contour of the cage wall, perhaps together with the position of a spring within the cage, prevents the roller from spinning. The rollers 320 are allowed to spin freely in one direction, indicated by directional arrow A2.

Figure 3:
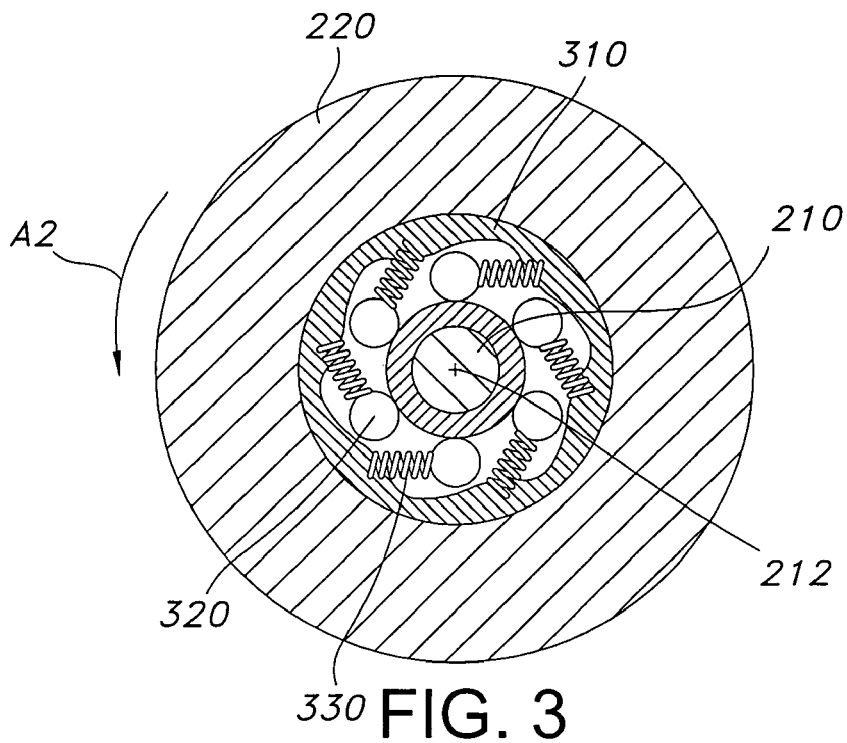
FIG. 3 is a cross-sectional view of the actuator assembly, through the rotation-restriction mechanism.

FIG. 3 is a cross-sectional view of the actuator assembly 200, showing the cross-section of the rotation-restriction mechanism 300 mounted on the shaft 210. The rollers 320 spin freely in the direction of rotation indicated by directional arrow A2. This allows the sleeve 220 to be rotated freely in the same direction of rotation. Moving the sleeve in the reverse direction causes the rollers 320 to shift within the cage 330, which causes the rotation-restriction mechanism 300 to lock and prevents the sleeve 220 from rotating to any significant extent in the reverse direction. The rotation-restriction mechanism 300 may be mounted anywhere along the shaft 210. Depending on the length of the actuator assembly 200 or the size of the bearings, one or more rotation-restriction mechanisms 300 may be mounted on the shaft 220. For example, a one-way bearing may be mounted at each end, or a single such bearing at one end or at or near to the center of the shaft 210. The rotation-restriction mechanism 300 may be mounted on the end of the shaft 210 that is attached to the handle 115.

Referring again to FIG. 2, the sleeve 220 is provided with a bore 222 that is dimensioned to receive the rotation-restriction mechanism 300. In the embodiment shown in FIG. 2, a first rotation-restriction mechanism 300A is fitted into the first end of the bore 222 at 200A and a second rotation-restriction mechanism 300B into the second end at 200B. The sleeve 210 with rotation-restriction mechanisms 300A and 300B fits slidingly over the shaft 210. A counterbore 224 is provided in the second end 200B of the actuator assembly 200 to accommodate a second attachment means 240 that holds the sleeve 220 on the shaft 210. The second attachment means 240 includes a threaded fastener 242, and, optionally, a roller bearing 244, and a washer 246. Ideally, the outer contour of the sleeve 220 is curved as shown, to increase the facility and comfort of the operator in grasping and manipulating the actuator assembly 200.

Figure 4A:
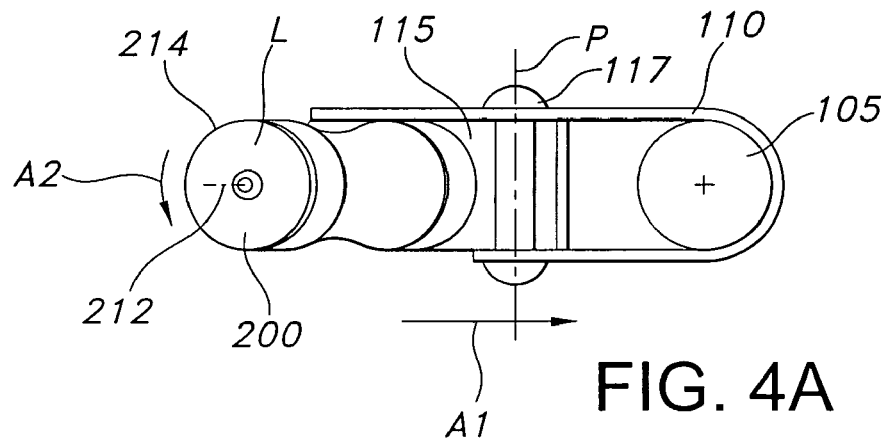
FIG. 4A illustrates the handle assembly in the open position.
Figure 4B:
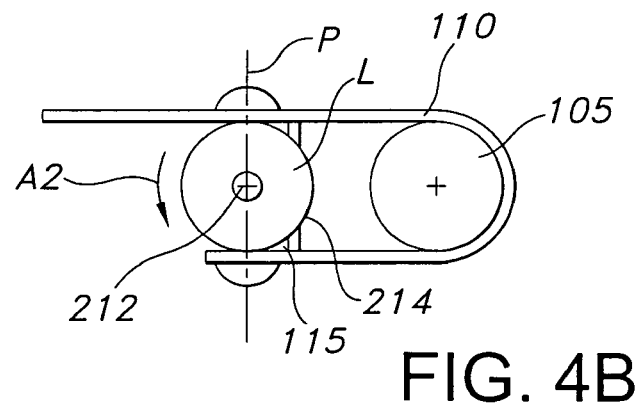
FIG. 4B illustrates the handle assembly in the closed position.

FIG. 4A and FIG. 4B are end-on views of the handle assembly 100 and actuator assembly 200 mounted on the left-hand handlebar of a bike, as seen from the operator's position, showing the open and closed positions, respectively. The operation of the device is accomplished by pulling the lever L towards the handlebar 105, in the direction indicated by directional arrow A1 Pulling the lever L causes the handle 115 to pivot about a pivot axis P that extends through pivot point 117 towards the handlebar 105. Simultaneously, the sleeve 220 rotates about the longitudinal axis 212 in the direction indicated by directional arrow A2. Because the sleeve 220 rotates while the lever L is being pulled toward the handlebar, the sleeve 220 rolls smoothly along the hand, from the fingertips toward the base of the fingers near the palm. This smooth change in position while force is being applied by the hand to the lever L and the handlebar 105 significantly eases the effort required to pull the cable 130 to actuate the brake, clutch, or other type of displacement mechanism that is connected to the distal end of the cable 130. This increased ease in exerting force and controlling the movement of the lever L is of great advantage for an operator who has smaller than average hands, or weak hand strength, or who must frequently actuate the lever L, such as, for example, an operator operating a bike hand clutch during a race or in traffic.

Typically, particularly with clutch or brake mechanisms, the lever L is biased toward the resting or open position. Thus, once the force exerted on the lever L and handlebar 10 is relaxed, the lever L will move toward the resting position, that is, will move in the direction reverse to directional arrow A1. In many applications, it is desirable to maintain control over the return movement of the lever L and to avoid a sudden jump of the lever L into the resting position. Control over the movement of the lever L is improved with use of the actuator assembly 200 according to the invention because of the rotation-restriction mechanism 300, which prevents the sleeve 220 from rotating in the direction reverse to directional arrow A2. This allows the operator to maintain better control of the lever L at the beginning of its return motion, when the biasing force is the greatest, because the lever L is positioned close to the palm of the operator's hand, allowing greater control over the lever L. Because the sleeve 220 does not roll, but slips along the fingers, it is easier to slow down the travel of the lever L with the fingers. Also, less and less force is required to control the lever L as it moves outward toward the fingertips in the direction of the biased position. The actuator assembly 200 according to the invention increases the amount of control over the lever L, and, thus, increases operational safety, because it increases the ease with which the operator can control the motion of the lever L.

Figure 5:
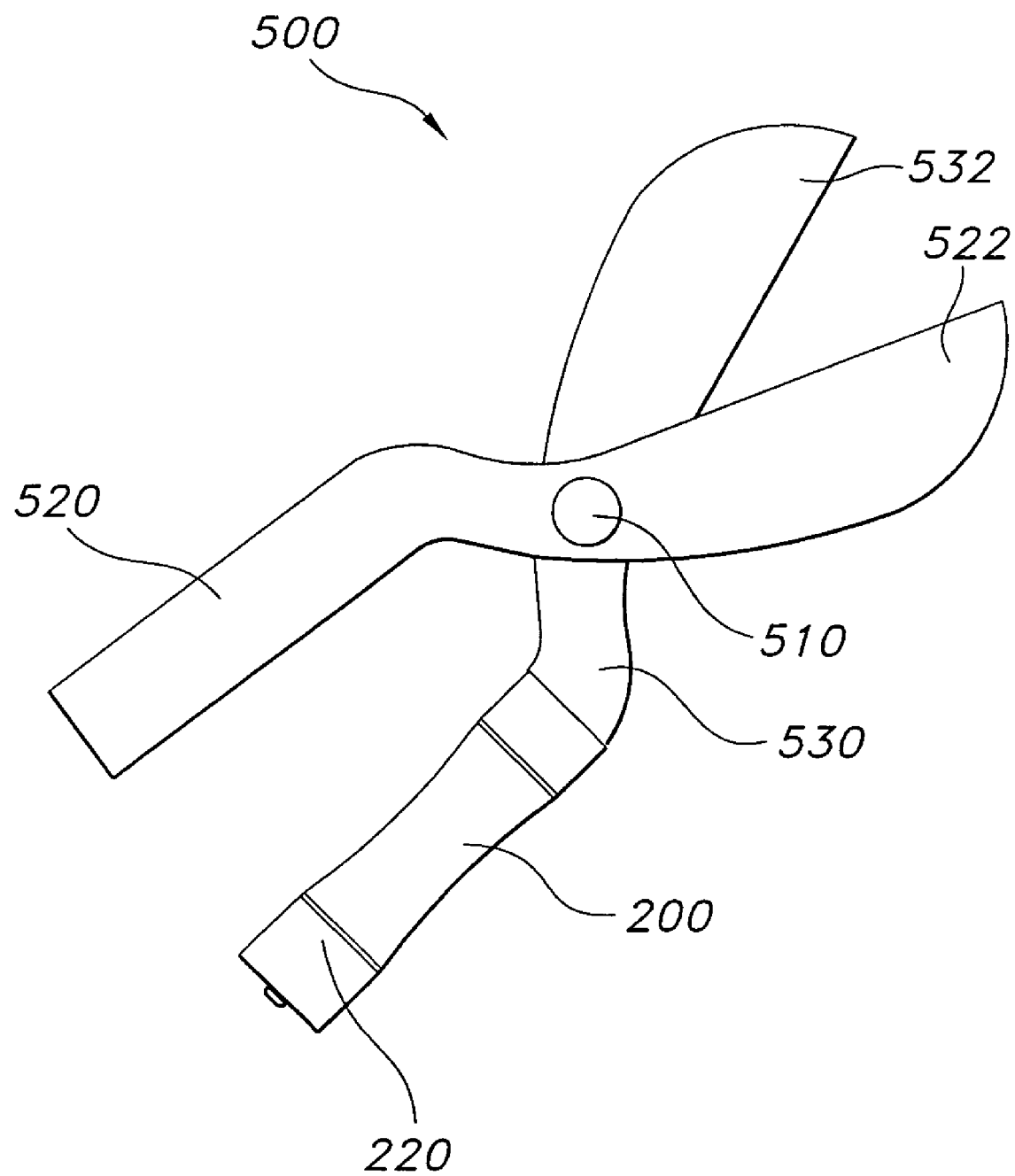
FIG. 5 illustrates the actuator assembly incorporated into a scissor-action tool.

FIG. 5 shows the actuator assembly 200 according to the invention incorporated into a scissor-action tool 500. The tool illustrated is a typical cutting tool that is spring-biased to an open position. This tool is for illustration purposes only and is representative of any type of scissor-action tool. The tool 500 has a pivot point 510 and two operational ends 532 and 522. An active grippper 530 extends from operational end 532 and a passive gripper 520 from operational end 522. The grippers 520 and 530 are connected at the pivot point 510. The actuator assembly 200 as shown in FIG. 2 above is incorporated into active gripper 530, with the outer part of the gripper being the sleeve 220. The tool 500 shown is a right-handed tool, for use in the right hand of the operator. It is understood that in a left-handed tool, the grippers 520,530 and direction of rotation of the active gripper 530 would be reversed. The passive gripper 520 is placed in the palm of the operator's hand and the active gripper 530 gripped by the fingertips of the operator. As the grippers are squeezed together, the sleeve 220 on the active gripper 530 rolls under the force applied by the fingers and the active gripper 530 moves along the gripping surface of the fingers toward the palm of the hand.

Figure 6:
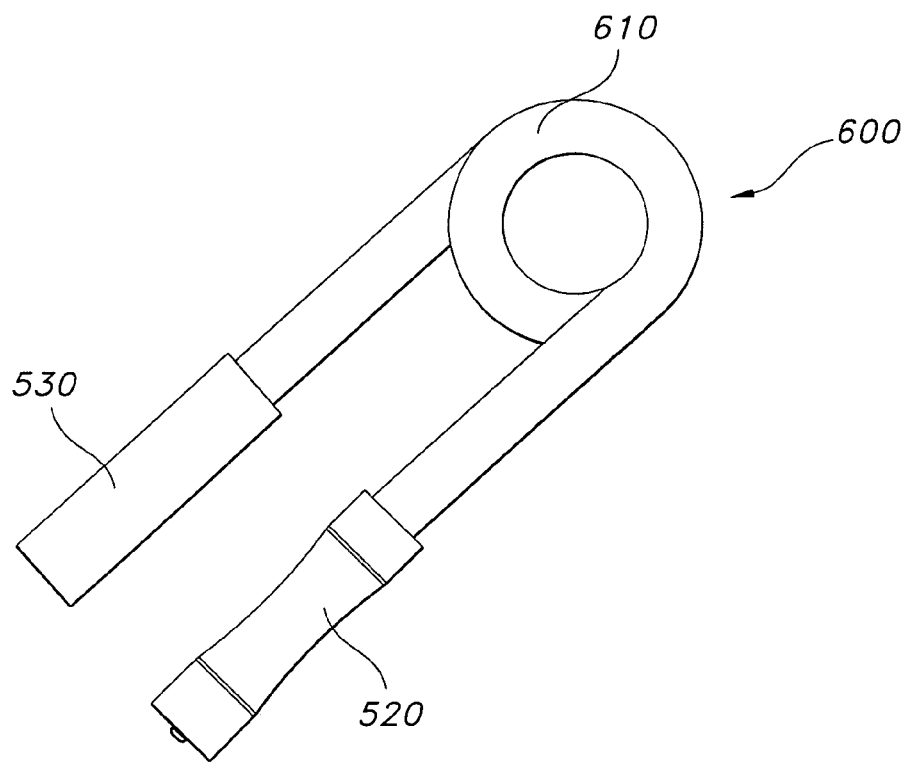
FIG. 6 illustrates the actuator assembly incorporated into a hand exercise device.

FIG. 6 illustrates a hand exercise device 600, wherein the actuator assembly 200 is incorporated into one of the grippers, which are essentially the same as the passive gripper 520 and the active gripper 530 described above in FIG. 5. The hand exercise device 600 is a coiled spring 610 with one of the two grippers 520 or 530 extending from each end of the spring 610. The passive gripper 520 is placed in the palm of the user's hand. The fingertips grasp the active gripper 530 and pull it toward the palm. As the active gripper 530 is moved toward the palm, it rolls along the inner surface of the fingers, from the outer fingertips in toward the palm. Once the actuator assembly 200 has moved passed the outermost fingerjoint, the stronger muscles between the palm and the second fingerjoint are used to work the hand exercise device 600.

Figure 7:
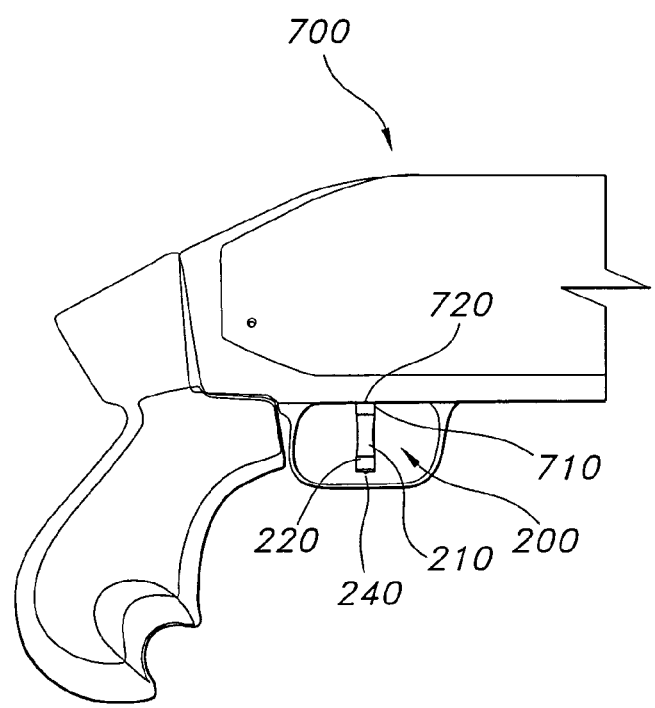
FIG. 7 illustrates the actuator assembly incorporated into a gun trigger mechanism.

FIG. 7 illustrates a portion of a handgun 700 with a trigger 710 that is pivotally attached to a conventional firing mechanism 720 that is not shown with any great detail in this illustration. In the embodiment shown, the trigger 710 is constructed with the actuator assembly 200 according to the invention. The shaft 210 is pivotably attached to the firing mechanism 720. The rotation-restriction mechanism 300 is mounted at the lower end of the shaft 210, and the sleeve 220 is assembled over the shaft 210 and the rotation-restriction mechanism 300. As with other embodiments, the sleeve 220 is shown shaped to accommodate the roundness of the operator's finger, although the shaft could also be a shaped as a straight cylinder. The attachment means 240 secures the rotation-restriction mechanism 300 on the shaft 210. Depending on how the rotation-restriction mechanism 300 is inserted into the actuator assembly 200, the direction of rotation of the sleeve 220 is adaptable to accommodate a right-handed or a left-handed operator. For example, when the rotation-restriction mechanism 300 is assembled onto the shaft 210 with a first end as the upper end, rotation is allowed in a first direction only. Inserting the rotation-restriction mechanism 300 with the first end as the lower end allows rotation only in a direction reverse to the first direction.

The embodiments of the invention mentioned herein are merely illustrative of the present invention. It should be understood that a person skilled in the art may contemplate many variations in construction of the present invention in view of the following claims without straying from the intended scope and field of the invention herein disclosed.

What is claimed is:

1. An actuator assembly for actuating or releasing a hand-operated mechanism that has a pivot means for actuating of the hand-operated mechanism, said actuator assembly comprising:
   a shaft having a longitudinal axis that extends central and parallel to said shaft and an operational end that is connected to said pivot means, said pivot means having a pivot axis that extends in a plane different from that of said longitudinal axis;
   a rotation-restriction mechanism mounted on said shaft; and
   a sleeve that extends concentric about said shaft and encases said rotation-restriction mechanism and said shaft, said sleeve being rotatable about said shaft in a first sleeve-rotation direction and said rotation-restriction mechanism restricting rotation of said sleeve to said first sleeve-rotation direction;
   wherein said shaft, said rotation-restriction mechanism, and said sleeve form a lever for actuating said hand-operated mechanism;
   wherein, when a force is applied to said lever in an operational direction, said operational direction being a direction that actuates said hand-operated mechanism, said lever rotates about said pivot means in said operational direction, while said sleeve rotates about said longitudinal axis in said first sleeve rotation direction; and
   wherein, when said force is removed from said lever, said lever rotates about said pivot means in a release direction that is opposite in direction to said operational direction, while said rotation-restriction mechanism prevents said sleeve from rotating in a direction opposite said first sleeve-rotation direction.

2. The actuator assembly of claim 1, wherein said sleeve has two sleeve ends and a middle portion therebetween, wherein an outer contour of said sleeve is curved to facilitate gripping by a hand, with said middle portion being concave and flaring to said sleeve ends.

3. The actuator assembly of claim 1, wherein said rotation-restriction mechanism includes a first rotation-restriction mechanism mounted on a first end of said shaft and a rotation-restriction mechanism mounted on a second end of said shaft.

4. The actuator assembly of claim 1, wherein said rotation-restriction mechanism is mounted at an end of said shaft.

5. The actuator assembly of claim 1, wherein said rotation-restriction mechanism is mounted centrally on said shaft.

6. The actuator assembly of claim 1, wherein said lever has a mounting end for affixing said lever to said hand-operated mechanism, wherein said rotation-restriction mechanism is assembled on said shaft at said mounting end.

7. The actuator assembly of claim 1, wherein said rotation-restriction mechanism is a one-way bearing.

8. The actuator assembly of claim 1, wherein said rotation-restriction mechanism is a ratcheting mechanism.

9. The actuator assembly of claim 1, further comprising a connector for connecting said lever to said hand-operated mechanism.

10. The actuator assembly of claim 9, wherein said hand-operated mechanism is a brake cable.

11. The actuator assembly of claim 9, wherein said hand-operated mechanism is a clutch cable.

12. The actuator assembly of claim 9, wherein said hand-operated mechanism is a gun trigger.

13. The actuator assembly of claim 1, wherein said hand-operated mechanism comprises two grippers, at least one of which is an active gripper, said two grippers being coupled to each other by said pivot means; and
   wherein said lever is incorporated into said active gripper.

14. The actuator assembly of claim 13, wherein said two grippers are include a first tool bar and a second tool bar pivotably connected to each other; said first tool bar having-said active gripper and a first tool end and said second tool bar having a passive gripper end and a second tool end.

15. The actuator assembly of claim 14, wherein said hand-operated mechanism is a cutting tool.

16. The actuator assembly of claim 15, wherein said hand-operated mechanism is a scissor-action cutting tool.

17. The actuator assembly of claim 14, wherein said hand-operated mechanism is a gripping tool.

18. The actuator assembly of claim 1, wherein said hand-operated mechanism is a hand-grip exercise tool having two grippers, wherein said pivot means is a resistance-force-generating spring, and wherein said lever is incorporated into at least one of said two grippers.

* * * * *